United States Patent [19]

Yang et al.

[11] 3,897,506

[45] July 29, 1975

[54] PROCESS FOR THE PRODUCTION OF FREON

[75] Inventors: Kang Yang; Gaylord G. Greenfield, both of Ponca City, Okla.; Joseph D. Henry, Jr., Morgantown, W. Va.

[73] Assignee: Continental Oil Company, Ponca City, Okla.

[22] Filed: May 7, 1973

[21] Appl. No.: 357,751

[52] U.S. Cl. .............................. 260/653.7; 423/483
[51] Int. Cl. .............................................. C07c 17/20
[58] Field of Search ................................. 260/653.7

[56] References Cited
UNITED STATES PATENTS

| | | | |
|---|---|---|---|
| 3,096,379 | 7/1963 | Blair | 260/653.7 |
| 3,436,430 | 4/1969 | Hall | 260/653.7 |
| 3,442,962 | 5/1969 | Vecchio et al. | 260/653.7 |
| 3,501,268 | 3/1970 | Laran et al. | 260/653.8 |

Primary Examiner—D. Horwitz
Attorney, Agent, or Firm—R. J. Carlson

[57] ABSTRACT

The present invention relates to an integrated process for the production of hydrogen fluoride, trichlorofluoromethane and dichlorodifluoromethane via the intermediate reaction between sodium bifluoride and hydrogen chloride. Sodium bifluoride is prepared from the reaction of ammonium fluoride and hydrogen fluoride with sodium nitrate. Ammonium fluoride may be prepared, in turn, by the reaction of fluosilicic acid with ammonia and water. The principal intermediate reaction between sodium bifluoride and hydrogen chloride results in the manufacture of hydrogen fluoride which may be utilized either to prepare freons by reaction with carbon tetrachloride or to prepare freons together with hydrogen fluoride by reaction with a mixture of methane and chlorine.

3 Claims, No Drawings

PROCESS FOR THE PRODUCTION OF FREON

Presently, hydrogen fluoride and fluorocarbons are made from acid grade fluorspar by the following reactions $$CaF_2 + H_2SO_4 \rightarrow 2HF$$
$$HF + CCl_4 \rightarrow HCl + CCl_3F$$

However, known reserves of this material source are rapidly dwindling. Therefore, it was imperative that another fluorine source be found and at the same time the development of an economical process to go with it. The present invention sets forth a direct answer to this pressing need by providing a new source of fluorine and an economical route to the production of profitable fluorine compounds.

In nature, fluorine also occurs as a component in phosphate rock, $Ca_{10}(PO_4)_6F_2$. In phosphate fertilizer operations, where the rock is acid digested, the fluorine is converted into crude $H_2SiF_6$ as indicated below $$Ca_{10}(PO_4)F_2 + 7H_2SO_4 \rightarrow 3Ca(H_2PO_4)_3 + 7CaSO_4 + 2HF$$
$$4HF + SiO_2 \rightarrow SiF_4 + 2H_2O$$
$$3SiF_4 + 2H_2O \rightarrow 2H_2SiF_6 + SiO_2$$

The known reserves of fluorine which can be recovered in this form are very large. Another raw material source which may be tapped is low-grade fluorspar. The technology involved in the processing of this source is substantially the same as that involved in the processing of $H_2SiF_6$.

Known processes which utilize by-product $H_2SiF_6$ can be divided into two categories, those which use inorganic fluorides directly as fluorinating agents and those which product anhydrous HF first and then freons. The former category includes the following:

$$CCl_4 + NaF \rightarrow CCl_3F + NaCl$$
$$CCl_4 + NaHF_2 \rightarrow CCl_3F + NaCl + HF$$
$$2CCl_4,1 + NaSiF_6 \rightarrow 2CCl_3F + 2NaCl + SiF_4$$
$$2CCl_4,g + NaSiF_6 \rightarrow 2CCl_3F + 2NaCl + SiF_4$$

All of these previous processes suffer from the need of utilizing catalyst such as $FeCl_3$ or $CrCl_3$ to attain commercially attractive reaction rates. Thus, an expensive process step to recover these catalysts must be included. Further, most of these type catalysts cause severe corrosion problems.

A typical process from the other category identified above is a process for converting $H_2SiF_6$ into anhydrous HF employing the following steps a. $H_2SiF_6 + 6NH_4OH \rightarrow Si(OH)_4 + 6NH_4F + 2H_2O$
b. $6NH_4F,aq \xrightarrow{220°} 3NH_4 \cdot HF + 3NH_3$
c. $3NH_4 \cdot HF + 3H_2SO_4 \xrightarrow{190°} 3(NH_4)HSO_4 + 6AF$
d. $6HF + 6CCl_4 \rightarrow 6HCl + 6CCl_3F$ This process presents problems of disposal. The HCl produced in step (d) is not used subsequently in the process and hence this HCl contaminated with HF must be disposed of. The HF produced in step (c) is contaminated with water and must be dehydrated which is both an expensive and corrosive undertaking.

Accordingly, it is an object of the present invention to provide an improved process for preparing hydrogen fluoride and freons from fluosilicic acid from phosphate rock acidulation.

It is a further object of the present invention to provide an integrated process for recovering hydrogen fluoride from fluosilicic acid, which process presents a lower cost for raw materials, is generally simpler and more direct from the standpoint of engineering, construction, and operation than prior art processes.

An additional object of the present invention is to utilize hydrogen fluoride to fluorinate chlorinated hydrocarbons to produce chlorofluorohydrocarbons such as trichlorofluoromethane and dichlorofluoromethane.

Other objects of the present invention will become apparent from a further reading of the present specification.

The present invention provides a method for the production of trichlorofluoromethane and/or dichlorodifluoromethane comprising reacting hydrogen fluoride with carbon tetrachloride to produce hydrogen chloride and trichlorofluoromethane or dichlorodifluoromethane, and separating said trichlorofluoromethane or dichlorodifluoromethane from said hydrogen chloride. The hydrogen chloride is used to react with sodium bifluoride to produce sodium chloride and hydrogen fluoride utilized in the previous reaction. The sodium bifluoride is produced by reacting ammonium fluoride with hydrogen fluoride and sodium nitrate and separating said sodium bifluoride from the product. The ammonium fluoride is produced by reacting fluosilicic acid with ammonia and water.

The present invention also provides a method for the production of hydrogen fluoride and freons together comprising the same steps as noted above except that a mixture of methane and chlorine are utilized as carbon and chlorine sources instead of carbontetrachloride.

In accordance with the process of the present invention, an integrated process utilizing the following reactions is practiced A. $H_2SiF_6 + 6NH_3 + 2H_2O \rightarrow 6NH_4F + SiO_2$
b. $6NH_4F + 6HF + 6NaNO_3 \rightarrow 6NH_4NO_3 + 6NaHF_2$
C. $6NaHF_2 + 6HCl \xrightarrow{300° - 400°} 12HF + 6NaCl$
D. $6HF + 6CCl_4 \rightarrow 6HCl + 6CCl_3F$ The overall stoichiometry for the process is $$H_2SiF_6 + 6NH_3 + 2H_2O + 6NaNO_3 + 6CCl_4 \rightarrow 6CCl_3F + SiO_2 + 6NaCl + 6NH_4NO_3$$

When it is derived to produce hydrogen fluoride and freons together, a gaseous mixture of methane and chlorine should be utilized as the carbon and chlorine sources instead of carbontetrachloride utilizing the following reaction in addition to the reactions shown above E. $CH_4 + 2Cl_2 \rightarrow 4HCl + CCl_4$ The overall stoichiometry for the process utilizing step (E) is $$H_1SiF_6 + 6NH_3 + 2H_2O + 6/5\ CH_4 + 24/5\ Cl_2 \rightarrow 6/5\ CCl_3F + 24/5\ HF + 6NaCl + 6NH_4NO_3 + SiO_2$$

The integrated process of the present invention offers a number of advantages not to be found in other commercial processes having similar objectives. It overcomes the two most critical shortcomings of previous processes, namely, (1) the requirement that wet HF be handled at elevated temperatures and (2) the need to dispose of HF-contaminated HCl.

In accordance with the integrated process of the present invention, fluosilicic acid, in an aqueous solution, is first treated with ammonia or ammonium hydroxide to produce ammonium fluoride as expressed in equation $$H_2SiF_6 + 6NH_3 + 2H_2O \rightarrow 6NH_4F + SiO_2$$

This reaction is well known in the art and should be carried out under known conditions. The solid products of the reaction, such as silicon dioxide, can be removed by any suitable means, such as filtration, thus leaving the ammonium fluoride remaining in solution.

According to the next reaction of the present integrated process, ammonium fluoride from Reaction A and ½ of the 12HF molecules from Reaction C are reacted with sodium nitrate to produce sodium bifluoride according to Reaction B $6NH_4F + 6HF + 6NaNO_3 \rightarrow 6NH_4NO_3 + 6NaHF_2$ Of course, sodium chloride may be employed instead of sodium nitrate in Reaction B. This reaction is known and should be conducted under known conditions to achieve the desirable results. The present process is of course not limited to ammonium fluoride produced in the manner disclosed.

In the next reaction of the present integrated process, sodium bifluoride from Reaction B and anhydrous hydrogen chloride from Reaction D or E are reacted to produce hydrogen fluoride and sodium chloride according to Reaction C $6NaHF_2 + 6HCl \rightarrow 12HF + 6NaCl$ Reaction C is especially advantageous, since it has quite unexpectedly been found that through the use of sodium bifluoride that the conversion of the fluoride to chloride is aobut 95 percent at a temperature in the range of about 300°–400°C, whereas, with sodium fluoride conversions of only about 20 percent are achievable and at a much lower reaction rate than that of sodium bifluoride. It has also been found that such high conversions at first reaction rates are achievable with sodium bifluoride, which contains up to about 20 percent sodium fluoride. Therefore, in light of these findings, it can readily be seen that the integrated process could be modified to reduce the 50 percent hydrogen fluoride recycle from Reaction C to Reaction B to any desired level.

The present invention also envisions two routes for preparing freons, one in conjunction with hydrogen fluoride and the other without the production of hydrogen fluoride. According to Reaction D $6HF + 6CCl_4 \rightarrow 6HCl + 6CCl_3F$ one-half of the 12HF molecules from Reaction C are reacted with carbontetrachloride to produce hydrogen chloride and trichlorofluoromethane. The hydrogen chloride produced in this reaction is, as previously stated, utilized as a reactant in Reaction C.

The other route for producing freons together with hydrogen fluoride comprises utilizing a gaseous mixture of methane and chlorine as the carbon and chlorine sources, instead of carbon tetrachloride, according to Reaction E $CH_4 + 2Cl_2 \rightarrow 4HCl + CCl_4$ It should be noted that dichlorodifluoromethane can be prepared similarly by the instant integrated process. However, in so doing some sodium bifluoride in Reaction B may remain in the aqueous phase. This fluoride can easily be recovered as $CaF_2$ by lime treatment or in the alternative recovered as cryolyte by treatment with bauxite or $Al(OH)_3$ which are known treatments. Further, if any fluoride is remaining in the solid phase in Reaction C and one desires to remove same, this can be accomplished by first dissolving NaCl in water and then adding either lime or $AlF_3$.

It will be well recognized that Reaction A can be performed utilizing established technology as well as Reaction B. Further Reaction D may be carried out using existing technology in which liquid HF is reacted with liquid $CCl_4$ in the presence of a catalyst such as $SbCl_5$. Reaction E can also be performed thermally with established technology.

Having thus set forth the present invention, the following examples are presented as being illustrative of the unique features thereof.

EXAMPLES

Sodium bifluoride was prepared by using the following reactions.
1. $NH_4F$, aq + HF, aq + $NaHO_3$, solid → $NaHF_2$
2. $H_2SiF_6$ + $6NH_3$ + $2H_2O$ → $6NH_4F$ + $SiO_2$
3. $6NH_4F$, aq + 6 NaCl, solid → $6NH_4Cl$ + 6NaF
4. 6NaF + 6HF, aq → $6NaHF_2$ In reaction (2) crude $H_2SiF_6$ was utilized, whereas, reagent grade reactants were used in reaction (1). Sodium fluoride was prepared by using reactions (2) and (3) or by using the following reaction (5)
5. $NaHF_2$     NaF + HF Sodium fluoride prepared by reaction (5) is denoted NaF*

Five grams of powdered $NaHF_2$, NaF and NaF*, respectively, were introduced into a Monel tube and Hcl gas was passed through the tube at 350°C at a flow rate of 100 cc/min. After each passage of 860 cc (1 atm, 25°C) of HCl the weight change as well as Cl⁻ and F⁻ concentration in the solid phase were determined. The results are summarized in Table 1.

Table 1

The Reaction of HCl with NaF, NaF*, or $NaHF_2$

| CC HCl Passed | $(W_{cl})$ × 100/$(W_{cl}$ + $W_F$ g) | | |
|---|---|---|---|
| | NaF | NaF* | $NaHF_2$ |
| 1 × 860 | 12 | 64 | 60.72 |
| 2 × 860 | 14 | 79 | 92.82 |
| 3 × 860 | 17 | 82 | 96.98 |
| 4 × 860 | 19 | 86 | — |

EXAMPLE 2

Sodium bifluoride was prepared by using either of the following two reactions
2. NaF, dry + HF aq    $NaHF_2$
3. NaCl, dry + $NH_4HF_2$ aq    $NH_4Cl$ + $NaHF_2$ Active sodium fluoride, to be denoted NaF*, was prepared by thermally decomposing $NaHF_2$
4. $NaHF_2$    NaF* + HF Five grams of solid reactant, NaF, NaF*, or $NaHF_2$, was introduced in a Monel tube, and HCl was passed through the tube at 350°C, and at a flow rate of 100 cc/min. After passing 860 cc (1 atm. and 25°C) of HCl, the weight change, as well as Cl⁻ and F⁻ concentrations in solid phase, were determined. The results were summarized in Table 2.

Table 2

The Reaction of HCl with NaF, NaF*, or $NaHF_2$

| cc HCl Passed | PERCENT CONVERSION OF F⁻ TO Cl⁻ | | |
|---|---|---|---|
| | NaF | NaF* | $NaHF_2$ |
| 1 × 860 | 29 | 49 | 60 |
| 2 × 860 | 41 | 65 | 92 |
| 3 × 860 | 49 | 71 | 96 |
| 4 × 860 | 54 | 77 | — |
| 5 × 860 | 59 | — | — |

Data in Table 2 reveal two quite unexpected results
A. NaF* is more reactive than NaF, and
B. $NaHF_2$ is much more reactive than NaF* or NaF.

It is to be understood that the invention is not limited by the specific examples and embodiments described hereinabove, but includes such changes and modifications as may be apparent to one skilled in the art upon reading the appended claims.

Having thus described the invention, we claim:

1. A method for the production of freons comprising, in combination, the steps of:
   a. reacting aqueous fluosilicic acid with ammonia to produce ammonium fluoride and silicon dioxide,
   b. recovering said ammonium fluoride and reacting it with hydrogen fluoride and sodium nitrate to produce ammonium nitrate and sodium bifluoride,
   c. recovering said sodium bifluoride and reacting it with hydrogen chloride to produce hydrogen fluoride and sodium chloride, wherein a portion of said hydrogen fluoride is recycled for utilization in step (b),
   d. recovering the remainder of said hydrogen fluoride and reacting it with carbontetrachloride to produce hydrogen chloride and freon, wherein said hydrogen chloride is recycled for utilization in step (c),
   e. separately recovering said freon.

2. The process of claim 1 wherein one half of the hydrogen fluoride produced in step (c) is recycled for utilization in step (b).

3. The method according to claim 1 wherein step (c) comprises reacting sodium bifluoride with anhydrous hydrogen chloride at a temperature of from about 300°C to about 400°C.

* * * * *

UNITED STATES PATENT OFFICE
CERTIFICATE OF CORRECTION

PATENT NO. : 3,897,506
DATED : May 7, 1973
INVENTOR(S) : Kang Yang; Gaylord C. Greenfield; Joseph D. Henry, Jr.

It is certified that error appears in the above-identified patent and that said Letters Patent are hereby corrected as shown below:

In the title, replace "freon" with chlorofluorohydrocarbons.
In the abstract, for freons, read--chlorofluorohydrocarbons.
Column 1, line 61, for "freons" read--chlorofluorohydrocarbons--
Column 3, line 44, for "freons" read--chlorofluorohydrocarbons--
Claim 1, line 1, for "freons" read--chlorofluorohydrocarbons--
part d, line 3, for "freons" read--chlorofluorohydrocarbons--
part e, last word, for "freon" read--chlorofluorohydrocarbons.

Signed and Sealed this second Day of December 1975

[SEAL]

Attest:

RUTH C. MASON
*Attesting Officer*

C. MARSHALL DANN
*Commissioner of Patents and Trademarks*